UNITED STATES PATENT OFFICE.

DANIEL W. PARKER, OF CAMBRIDGE, MASSACHUSETTS.

IMPROVEMENT IN STOVE-POLISH.

Specification forming part of Letters Patent No. 187,897, dated February 27, 1877; application filed January 11, 1877.

*To all whom it may concern:*

Be it known that I, DANIEL W. PARKER, of Cambridge, in the county of Middlesex and State of Massachusetts, have invented a new and useful Improvement in the Manufacture of Stove Blacking or Polish, of which the following, taken in connection with the accompanying drawings, is a specification:

My invention relates to that class of stove blackings or polishes made in the form of a paste, as distinguished from liquid blackings, or the blackings put up in solid bars or sticks in a dry state; and it consists in the combination and union of certain ingredients to form a paste suitable to be used for blacking and polishing stoves, grates, and other like articles, the names of said ingredients, the proportions in which they are used, and the process of properly uniting them to form the paste being as hereafter described.

My improved paste stove-polish is composed of the following ingredients, in about the proportions named, viz: One part unslaked lime, two parts resin, four parts tallow, four parts sal-soda, ten parts plumbago, and twenty parts fresh water, the proportions being determined by weight.

These are the proportions that I prefer as giving the best result; but the proportions of all of the articles, or either of them, may be slightly varied, and the quantity of plumbago and water may be varied to a considerable extent, without materially affecting the quality of the polish.

The process of uniting the ingredients to form the paste is as follows: I mix the lime and sal-soda in a dry state, and then dissolve them in boiling water. I then melt the resin and tallow together in another vessel, mix the melted resin and tallow with the dissolved lime and sal-soda, boil the whole mass twenty minutes, and then stir in the plumbago and allow the mass to cool, when the paste is ready to be packed in boxes or other suitable receptacle for the market.

This paste may be applied to a stove, grate, or other like article with a woolen rag, and by rubbing with another woolen rag, or a dry side of the same rag, a brilliant polish may be obtained without the use of a brush, and without making any dust or dirt, which is so annoying a feature of the use of most, if not all, the stove-polishes now in use.

This blacking or polish always retains its pasty nature, never becoming hard, and requires only the application of a little water to prepare it for application.

What I claim as new, and desire to secure by Letters Patent of the United States, is—

The improved stove blacking and polish composed of lime, resin, tallow, sal-soda, plumbago, and fresh water, the whole combined substantially as and in about the proportions herein set forth.

Executed at Boston, Massachusetts, this 9th day of January, A. D. 1877.

DANIEL W. PARKER.

Witnesses:
  N. C. LOMBARD,
  E. A. HEMMENWAY.